US006725534B1

(12) United States Patent
Schwartzbauer

(10) Patent No.: US 6,725,534 B1
(45) Date of Patent: Apr. 27, 2004

(54) EXTRACTION TOOL WITH STEPPED INTERFACE BETWEEN EXTRACTION SEGMENTS AND TRASVERSE LOAD

(75) Inventor: George A. Schwartzbauer, Roseville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 192 days.

(21) Appl. No.: 09/711,207

(22) Filed: Nov. 9, 2000

Related U.S. Application Data

(60) Provisional application No. 60/169,011, filed on Dec. 3, 1999.

(51) Int. Cl.[7] .................................................. B23P 19/04

(52) U.S. Cl. ............................ 29/764; 29/762; 29/749; 29/750; 29/758; 29/837; 29/426.5; 29/242; 29/270; 29/278; 81/44; 254/18

(58) Field of Search .......................... 29/739, 747, 748, 29/750, 751, 752, 758, 762, 764, 837, 426.1, 426.5, 242, 270, 278, 280, 282, 264, 252; 81/44; 254/18, 28

(56) References Cited

U.S. PATENT DOCUMENTS 2,452,457 A * 10/1948 Gray et al.
2,533,112 A * 12/1950 Hayden
2,774,133 A * 12/1956 Sitz
2,976,608 A * 3/1961 Busler
3,010,193 A * 11/1961 Croall, Jr. et al.
3,136,040 A 6/1964 Bauer et al.
3,451,117 A * 6/1969 Cameron
3,460,229 A * 8/1969 Crew et al.
3,621,555 A * 11/1971 Cowmeadow
3,636,612 A * 1/1972 Suprun
4,083,101 A * 4/1978 Coller
4,131,982 A 1/1979 Rose et al. ................ 29/566.2
4,171,565 A 10/1979 Boudreau et al. ............. 29/739
4,232,422 A * 11/1980 Fellmann
4,285,123 A 8/1981 Chisholm .................... 29/764
D264,300 S * 5/1982 Imm
4,351,109 A 9/1982 Kelly et al. .................... 29/747
4,402,133 A 9/1983 Cribbs et al. ................. 29/739
4,494,305 A 1/1985 Safai ........................... 29/764
4,512,071 A * 4/1985 Fieberg et al.
4,631,817 A * 12/1986 Bailey et al.
4,864,718 A * 9/1989 Ricard
5,075,960 A 12/1991 Smith .......................... 29/739
5,161,301 A * 11/1992 Kilsdonk
6,067,705 A 5/2000 Boyde et al. ................. 29/764
6,601,277 B1 * 8/2003 Swanson

FOREIGN PATENT DOCUMENTS

GB 2226974 * 7/1990

* cited by examiner

*Primary Examiner*—David P. Bryant
*Assistant Examiner*—Eric Compton
(74) *Attorney, Agent, or Firm*—Westman, Champlin & Kelly, P.A.

(57) ABSTRACT

An extraction tip having first and second extraction segments. The first extraction segment is positioned at a distal end of the extraction tip and the second extraction segment is spaced therefrom. The first extraction segment includes an axial slot for transverse insertion of a stem portion of a pin and the second extraction segment is recessed from the first extraction segment to form a stepped surface between the first and second extraction segments. The second extraction segment is non-expandable to hold a head portion of the pin in abutment with the stepped surface so that the stepped surface pushes against the head portion to eject the pin.

15 Claims, 9 Drawing Sheets

EXTRACTION TOOL WITH STEPPED INTERFACE BETWEEN EXTRACTION SEGMENTS AND TRASVERSE LOAD

CROSS-REFERENCE TO RELATED APPLICATION

The present application claims priority to Provisional Application Ser. No. 60/169,011, filed Dec. 3, 1999, entitled "POGO PIN REMOVAL TOOL".

FIELD OF THE INVENTION

The present invention relates to an extraction device. In particular, the present invention relates to an extraction device which has particular application for extracting conductive pins providing an electrical connection for components of a disc drive.

BACKGROUND OF THE INVENTION

Electrical connections between interfacing components can be made by a series or array of conductive pins. Often times one of the conductive pins in an array or series of conductive pins can become defective. The proximity and placement of conductive pins makes it difficult to remove the conductive pins for replacement. Disc drives include discs for storing data or digital information and heads to read or write data from the discs. Operating commands are transferred to the disc drive from a host system and data from the disc is transmitted to the host system. The disc drive includes electrical contacts for electrically connecting circuitry of the disc drive to the host system.

Disc drives are tested in environmental chambers to simulate various operating environments. Disc drives are inserted into environmental chambers and are connected to a host testing system to test read and write operations of the disc drive. The host testing system is connected to the disc drive via a plurality of conductive pins including a head portion and a stem portion. The pins are aligned so that the head portion contacts conductive pads or pins on the disc drive and the stem portion is conductively coupled to circuitry of the host system. If any of the conductive pins are defective, testing operation of the disc drive is compromised. Removal of defective pins is difficult because of the location of the pins in an enclosed testing chamber and the proximity of the pins to one another. The present invention addresses these and other problems and offers solutions not recognized nor appreciated by the prior art.

SUMMARY OF THE INVENTION

The present invention relates to an extraction device having first and second extraction segments for removing conductive pins in a series or array of pins. The first extraction segment is positioned at a distal end of an extraction tip and the second extraction segment is spaced therefrom. The first extraction segment includes an axial slot for transverse insertion of a stem portion of a pin and the second extraction segment is recessed from the first extraction segment to form a stepped surface between the first and second extraction segments. The dimension of the second extraction segment is non-expandable to hold a head portion of the pin in abutment with the stepped surface so that the stepped surface pushes against the head portion to eject or remove the pin.

DETAILED DESCRIPTION OF ILLUSTRATIVE EMBODIMENTS

Figure 1:
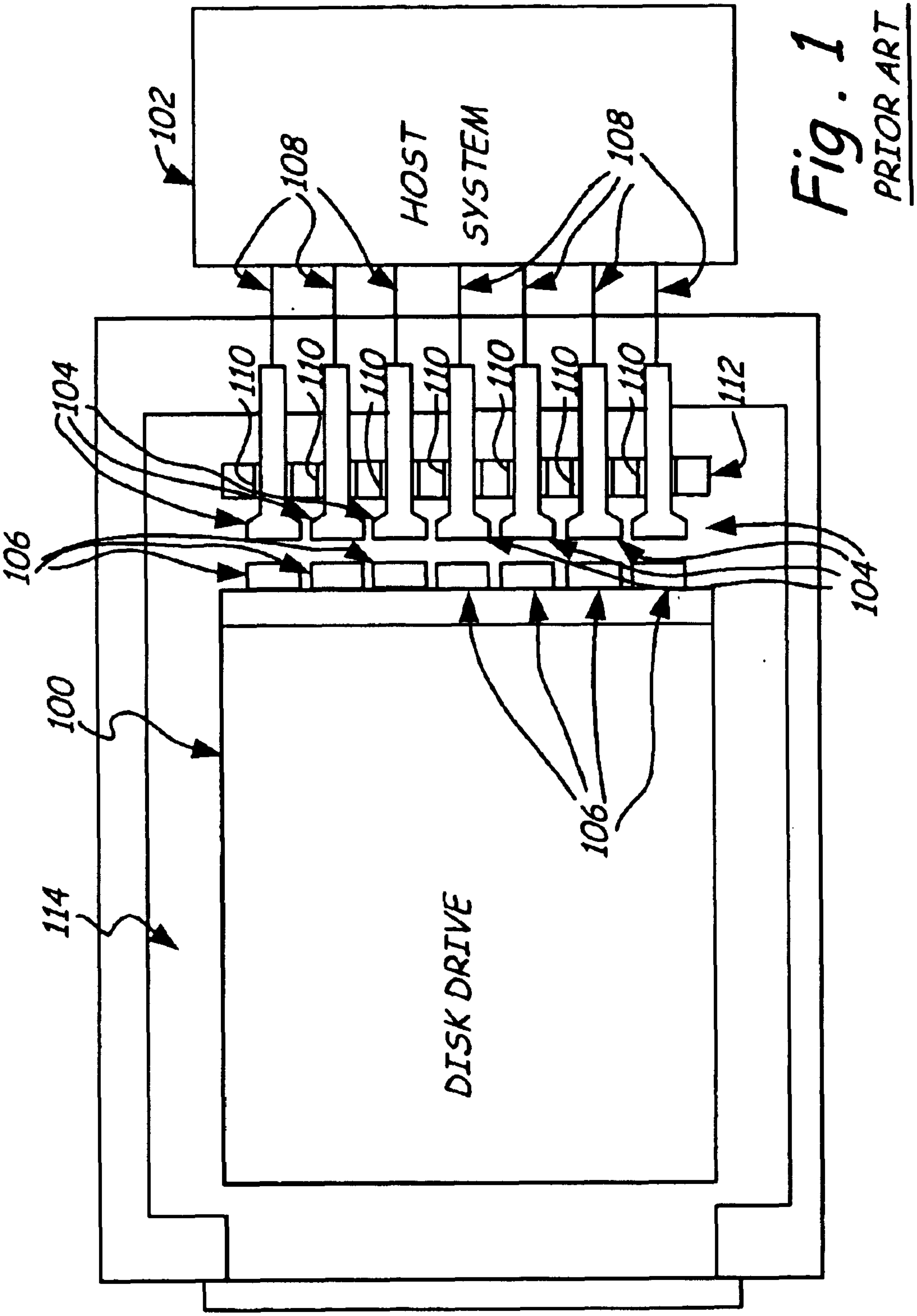
Fig. 1 PRIOR ART
FIG. 1 is a schematic illustration of conductive pins interfaced between a disc drive and a host system.

The present invention relates to a removal tool for removing or extracting conductive pins between interfacing components. As shown schematically in FIG. 1, disc drive 100 is electrically coupled to a host system 102 by conductive pins 104. As shown, disc drive 100 includes a plurality or series of conductive pads or pins 106 coupled to circuitry of the disc drive 100. Conductive pins 104 are formed of a conductive material and are adapted to contact conductive pads 106 to electrically connect the disc drive 100 to the host system 102 which is electrically coupled to pins 104 as illustrated diagrammatically by line 108 in FIG. 1. In the embodiment shown, conductive pins 104 are supported in slots 110 of an interface board 112 to provide electrical connection between disc drive 100 and host system 102 as described.

Disc drive 100 is inserted into an environmental testing chamber 114 and connected to host system 102 for testing operations. The disc drive 100 is subjected to simulated environmental operating conditions in the testing chamber 114 to test performance of the disc drive under various operating conditions. Operation of the disc drive 100 is tested via interface with the host system 102. Thus, for proper test operations, the conductive pins 104 must provide a desired electrical connection between the disc drive 100 and host system 102.

Figure 2:
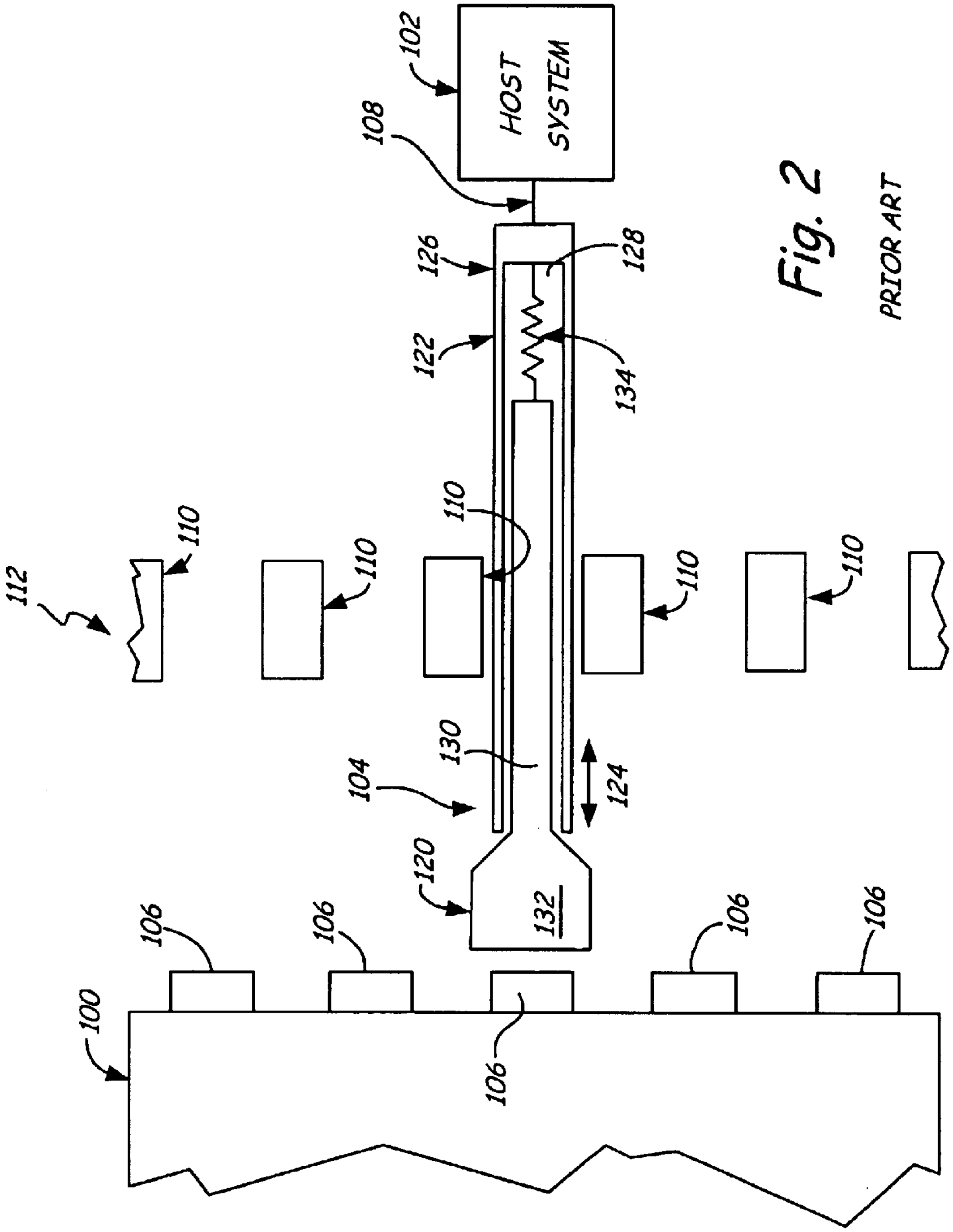
Fig. 2 PRIOR ART
FIG. 2 is a detailed illustration of a conductive pin interface between a disc drive and a host system.

As shown in more detail in FIG. 2 conductive pins 104 include an enlarged head portion 120 adapted to contact the conductive pad 106 of the disc drive 100 and an elongated stem portion 122 extending therefrom to electrically coupled to host system 102 as illustrated by line 108. In the particular embodiment shown in FIG. 2 conductive pin 104 is a "pogo" pin formed of a composite structure where the head portion 120 is slideably supported relative to the stem portion 122 as illustrated by arrow 124. The composite structure includes a tubular stem portion 126 having a central bore 128 and an elongated rod 130 supporting an enlarged head 132 slideable in bore 128. Rod 130 is spring biased in an extended position in bore 128 as illustrated diagrammatically at 134 so that head 130 contacts one of the conductive pads 106 of disc drive 100.

Figure 3:
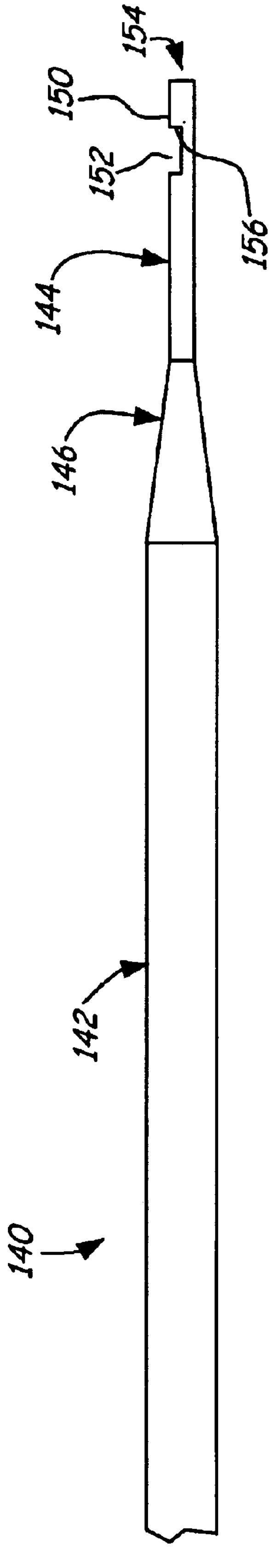
FIG. 3 is a plan view of an embodiment of an extraction tool of the present invention.

If a conductive pin 104 is defective, the pin 104 may not provide a sufficient electrical connection between the disc drive 100 and host system 102 degrading test operations of the disc drive 100. The location of the pins 104 at a rear of the chamber 114 and the close proximity of adjacent pins 104 make it difficult to remove the pins 104 for replacement or exchange. FIG. 3 illustrates an embodiment of an extraction tool 140 for extracting defective pins 104 from a series or array of closely spaced pins 104. As shown, tool 140 includes a handle 142 and an extraction tip 144. In the embodiment shown, tool 140 includes a tapered neck portion 146 providing a dimensional transition between the handle 142 and the extraction tip 144 which is sized smaller than handle 142 for insertion between closely spaced pins 104 for extraction. Although a particular tapered neck portion 146 is shown, application is not limited to the particular tapered transition shown between the handle 142 and the extraction tip 144.

Extraction tip 144 includes first and second extraction segments 150, 152. The first extraction segment 150 is at a distal end 154 of extraction tip 144 and the second extraction segment 152 is proximally spaced therefrom. Extraction segment 152 is recessed from extraction segment 150 to form a stepped surface 156 between the first and second extraction segments 150, 152. The stepped surface 156 defines an extraction face for supplying an extraction force to the head portion 120 of pin 104 as will be explained.

Figure 4:
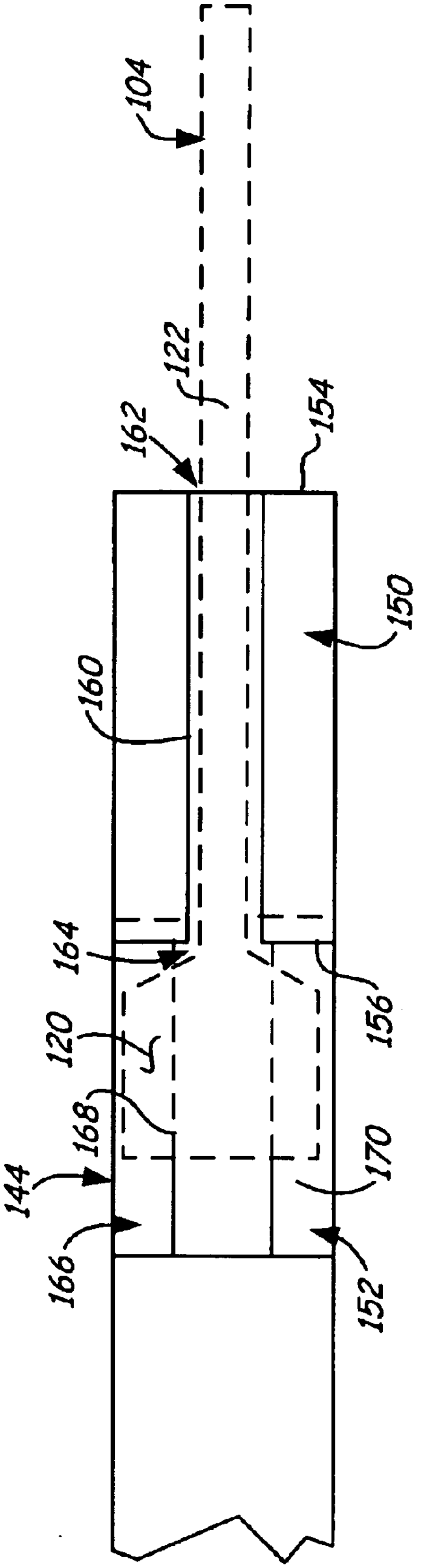
FIG. 4 is a top plan view of an embodiment of an extraction tip of the present invention.
Figure 5:
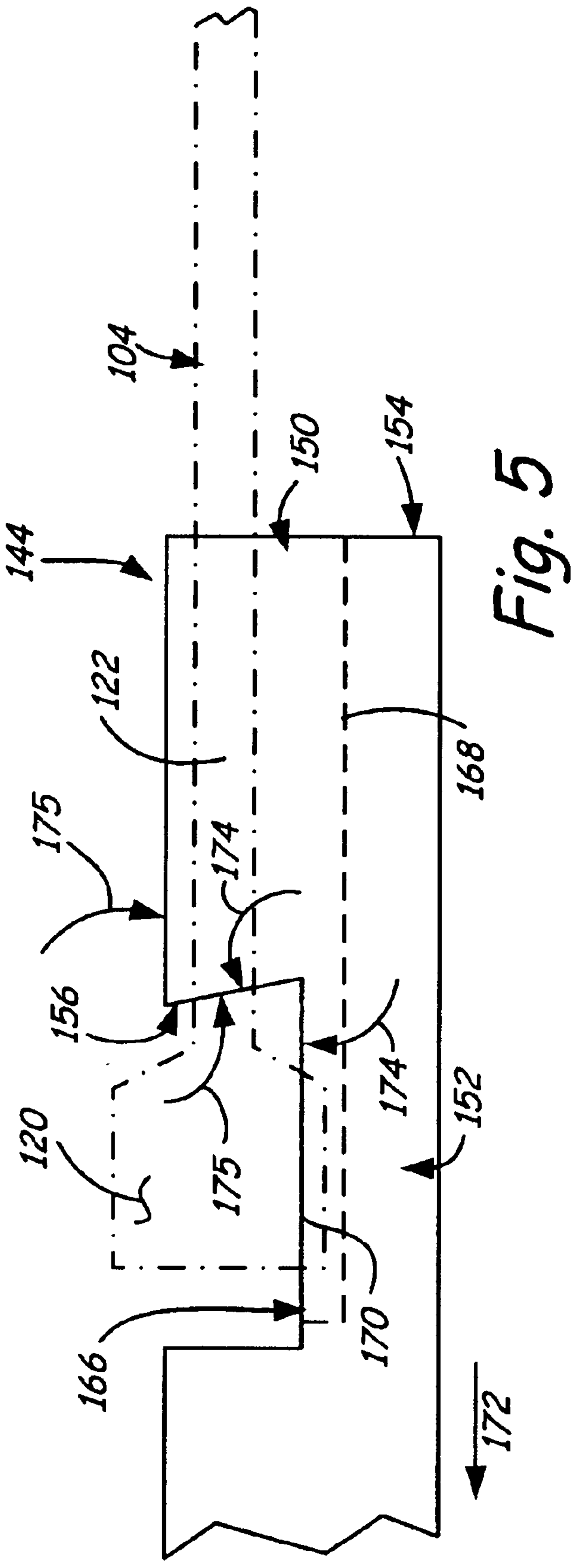
FIG. 5 is a side elevational view of the embodiment of the extraction tip of FIG. 4.

FIGS. 4–5 are detailed illustrations of the extraction tip 144 with a conductive pin 104 loaded in the tip 144 for extraction as illustrated in phantom. As shown in FIG. 4, the first extraction segment 150 includes an axial slot 160 extending inwardly from an outer surface of the first segment 150. The axial slot 160 extends along the first extraction segment 150 to the stepped surface 156. The slot 160 is sized wide enough for insertion of the stem portion 122 of pin 104 as will be explained.

In the embodiment shown, slot 160 extends along extraction segment 150 between opposed opened ends 162, 164. The second extraction segment 152 is formed of an offset structure or recessed portion 166 extending from the stepped surface 156. In the embodiment shown in FIG. 5, the offset structure 166 includes an elongated well 168 formed in a recessed base surface 170 and sized to receive a portion of enlarged head 120.

For use, the extraction tip 144 is aligned with a defective pin so that extraction segment 150 is longitudinally aligned with stem portion 122 and extraction segment 152 is aligned with head portion 120. Extraction tip 144 is moved to insert stem portion 122 of pin 104 into slot 160 for transverse load of the pin 104 into the extraction tip 144. The pin 104 extends through opened end 164 so that head portion 120 is seated in well 168 and a surface of head portion 120 abuts stepped surface 156 for extraction.

Tool 140 is withdrawn as illustrated by arrow 172 in FIG. 5. As the tool 140 is withdrawn the head portion 120 of the pin 104 is held against surface 156. The extraction tip 144 (and second segment 152) is formed of non-radially expandable structure so that as the tool 140 is withdrawn the head portion remains in well 168 with a portion of head 120 in abutment with the stepped surface 156. For withdrawal the stepped surface 156 pushes against head 120 in the direction illustrated by arrow 172 to eject the pin 104 for removal. In the embodiments illustrated in FIGS. 4–5, stepped surface 156 is sloped at an angle 174 to form an acute angle relative to base surface 170. The angled surface facilitates ejection of pin 104 via retraction of tip 144 in the direction illustrated by arrow 172. Although a particular acute angle 174 is shown, application is not limited to the specific angle shown. Preferably the stepped surface 156 is sloped at an 80° angle relative to a longitudinal surface of the first segment as illustrated by arrows 175 in FIG. 5.

Figure 6:
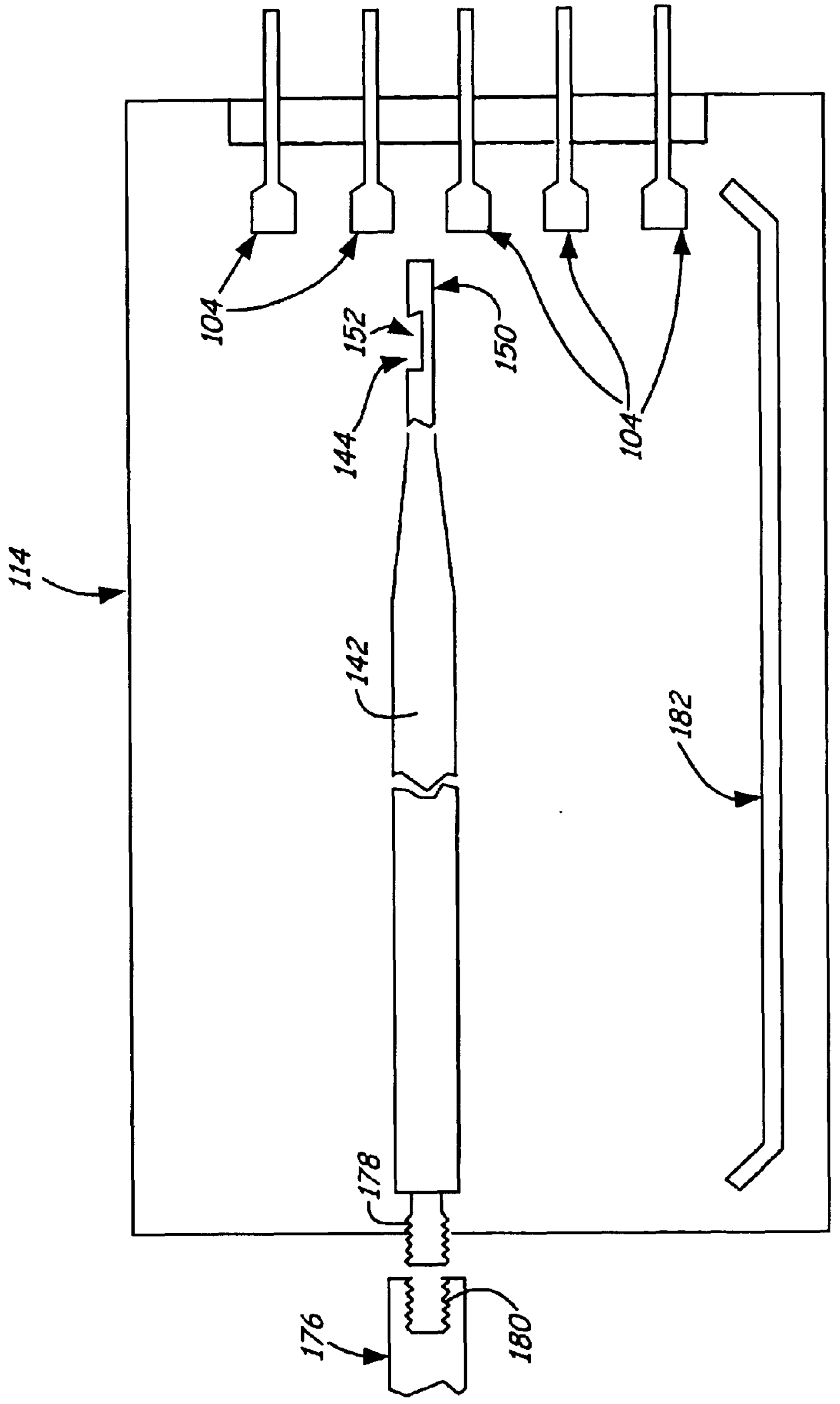
FIG. 6 illustrates removal of a conductive pin with an extraction tip of the present invention.

As described, extraction tip 144 is sized for insertion between closely spaced pins 104 as illustrated in FIG. 6. As shown, a handle extension 176 can be attached to handle 142 to allow a user to locate the extraction tip 144 at a rear of chamber 114 proximate to pins 104. Handle extension 176 is attached to a threaded end 178 of handle 142 which threadably mates into a threaded bore 180 of handle extension 176. As shown in the embodiment of FIG. 6, once the pin 104 is extracted, pin 104 drops into a chamber tray 182 inserted in chamber 114 to easily retrieve the extracted pin from the elongated chamber 114.

Figure 7:
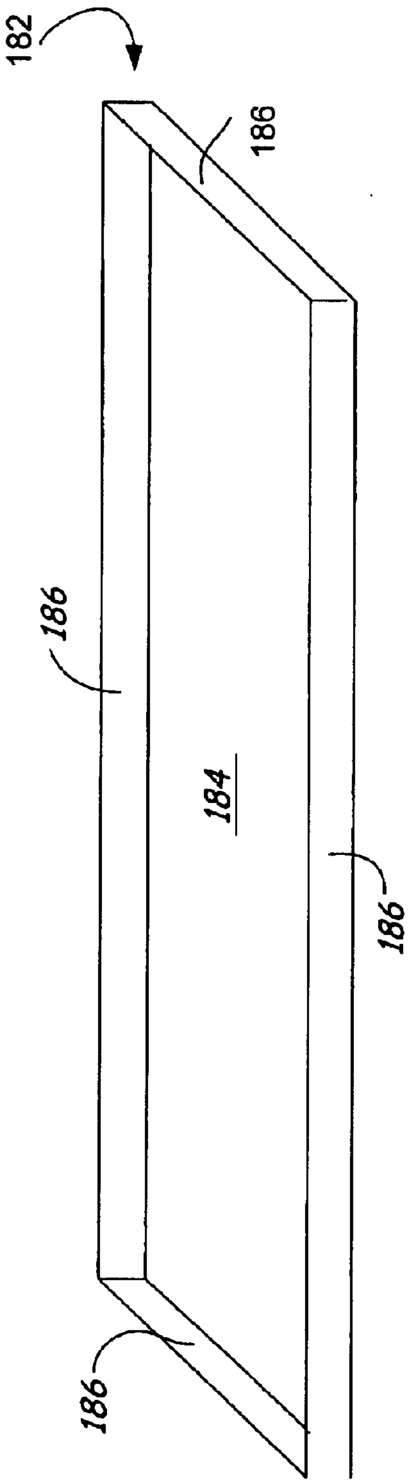
FIG. 7 is a perspective view of an embodiment of a chamber tray for capturing a removed pin.
Figure 8:
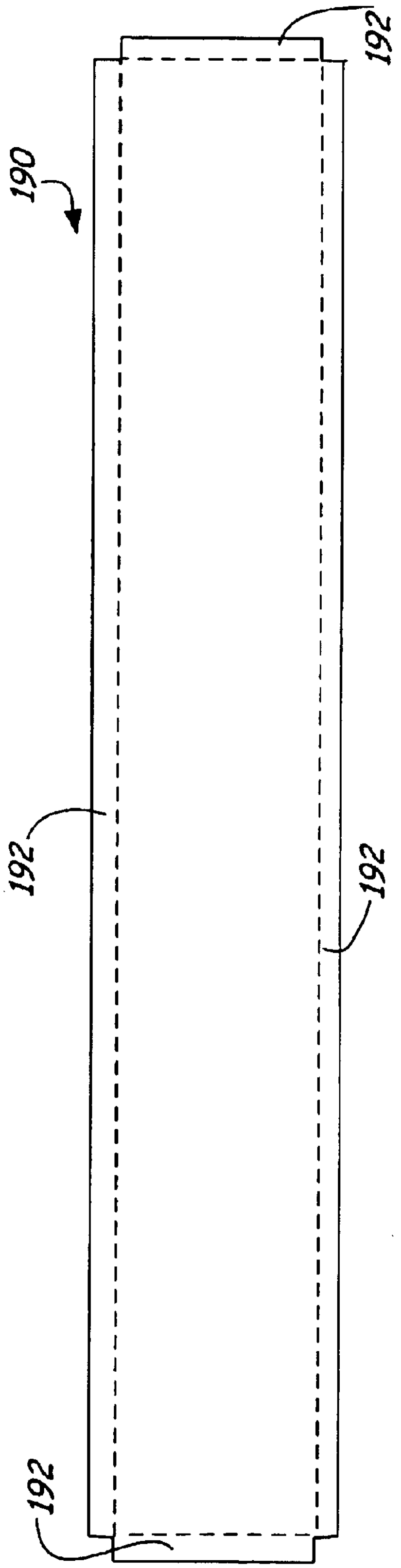
FIG. 8 is an illustration of a sheet forming the tray illustrated in FIG. 7.

FIG. 7 illustrates an embodiment of tray 182. Tray 182 includes an elongated base 184 and perimeter walls 186. The elongated length is sized to extend along a length of chamber 114 so that extracted pins 104 drop into tray 182 for easy removal and are not lost in the chamber 114. The base 184 of tray 182 is formed from a metal sheet 190 shown in FIG. 8 and perimeter flaps 192 are folded to form perimeter walls 186 as shown in FIG. 7.

Figure 10:
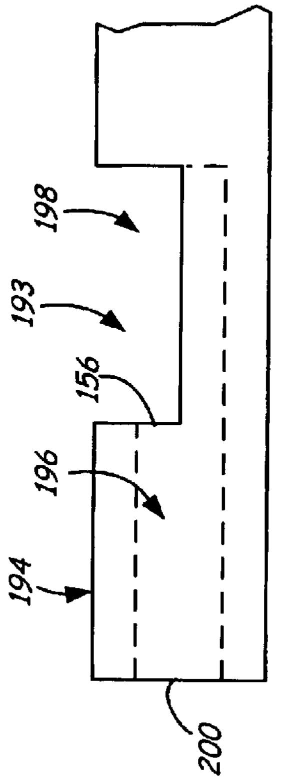
FIGS. 9–11 illustrate an embodiment of an extraction tip of the present invention.
Figure 11:
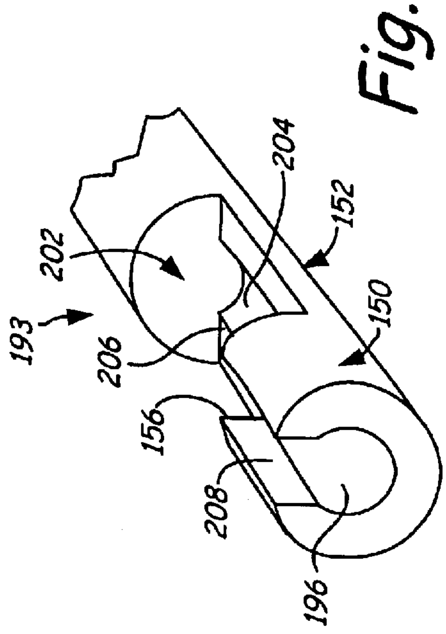
Figure 9:
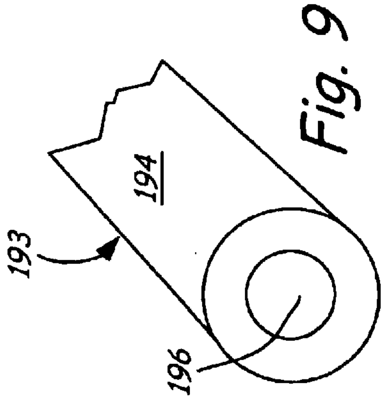

FIGS. 9–11 illustrate manufacture of an embodiment of extraction tip 193. As shown in FIG. 9, extraction tip is formed of cylindrical base 194. A central lumen 196 is bored in cylindrical base 194; the diameter of which is determined based upon a curvature of a portion of head 120 as will be explained. As shown in FIG. 10, a recessed portion or groove 198 is cut in base 194 spaced from a distal end 200 of base 194 to form an offset half moon shaped structure 202 shown in FIG. 11. The half-moon shaped structure forms the second extraction segment 152 and stepped surface interface 156 between the first and second extraction segments 150, 152. A portion of lumen 196 along the recessed structure 202 forms a curved well 204 in a base surface 206. An elongated slot 208 is cut along longitudinal axis of cylindrical base 194 from the distal end 200 of the cylindrical base 194 to the stepped surface 156 for insertion of the stem portion 122 in the first extraction segment 150. Thus, as described, a relatively small diameter extraction tip 193 is formed having multiple extraction portions designed to interface with head and stem portions of a conductive pin to extract pins from a closely spaced array of pins.

Figure 12:
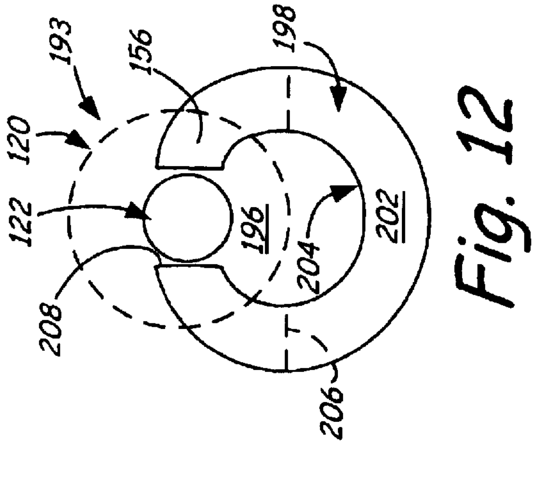
FIG. 12 is an illustration of a head portion abutting a stepped interface between segments of the extraction tip of FIG. 11.

As shown more clearly in FIG. 11, lumen 196 has a diameter sized so that the well 204 formed from a portion of lumen 196 along the recessed structure 202 includes a radius of curvature similar to a portion of head 120 so that a portion of head 120 seats in the well 204. As shown in FIG. 12, stepped surface 156 forms a contact surface which overlaps with head portion 120 shown in phantom in FIG. 12 to form an ejection surface for extracting pins 104. Preferably cylindrical extraction tip 193 is coupled to a cylindrical handle having a larger radial dimension than the extraction tip 193 and a cone shaped transition connects the handle to the cylindrical extraction tip 193. Although a particular shape is described for extraction tip 193, application is not limited to the specific cylindrical shape described.

Figure 13:
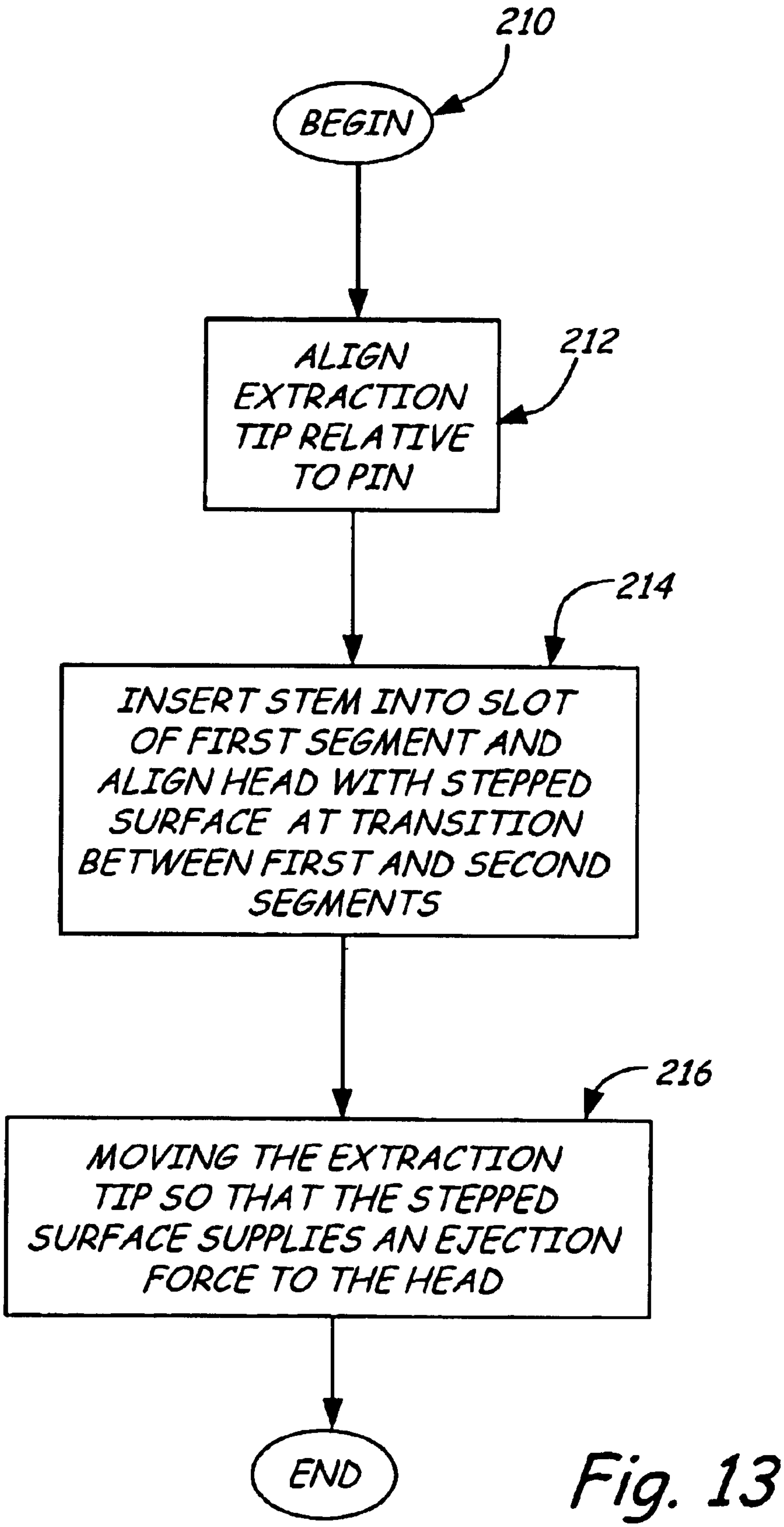
FIG. 13 is a flow chart illustrating steps for extracting a conductive pin of the present invention.

FIG. 13 is a flow chart illustrating sequence steps of operation for extracting a pin 104 with the extraction tip of the present invention. As shown, operation begins as illustrated by block 210. The extraction tip is aligned as illustrated by block 212. Stem portion 122 is inserted into slot and head portion 120 is aligned with stepped surface 156 as illustrated by block 214. Extraction tip 144 is then moved in a direction illustrated by arrow 172 in FIG. 5 so that stepped surface 156 biases against head portion 120 to supply an ejection force to remove pins 104 as illustrated by block 216.

An extraction tip having first and second extraction segments 150, 152. The first extraction segment 150 is positioned at a distal end of the extraction tip and the second extraction segment 152 is spaced therefrom. The first extraction segment 150 includes an axial slot 160, 208 for transverse insertion of a stem portion 122 of a pin 104 and the second extraction segment 152 is recessed from the first extraction segment 150 to form a stepped surface 156 between the first and second extraction segments 150, 152. The dimension of the second extraction segment 152 is non-expandable to hold a head portion 120 of the pin 104 in abutment with the stepped surface 156 so that the stepped surface 156 pushes against the head portion 120 to eject the pin 104.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to an extraction device for extracting interface pins for a disc drive in a testing chamber for a disc drive system, it will be appreciated by those skilled in the art that the teachings of the present invention can be applied to other interface systems without departing from the scope and spirit of the present invention.

What is claimed is:

1. An extraction tool comprising:

an extraction tip having a proximal end and a distal end and first and second extraction segments, the first extraction segment being positioned proximate to the distal end and the second extraction segment being spaced from the distal end and the extraction tip including a stepped surface at an interface between the first extraction segment and a recessed surface of the second extraction segment, and the first extraction segment including an axially extending slot extending along a length of the first extraction segment to the stepped surface sized for insertion of a stem portion of a pin and the stepped surface being inclined relative to the recessed surface of the second extraction segment to form an acute angle between the stepped surface and the recessed surface of the second extraction segment to eject the pin; and an elongated handle or portion coupled to the extraction tip.

2. The extraction tool of claim 1 wherein the handle or portion includes a first profile dimension and the extraction tip includes a second smaller profile dimension and including a tapered transition portion between the first profile dimension of the elongated handle or portion and the second profile dimension of the extraction tip.

3. The extraction tool of claim 1 wherein the elongated handle or portion is cylindrically shaped.

4. The extraction tool of claim 1 wherein the extraction tip is cylindrically shaped.

5. The extraction tool of claim 1 wherein the second extraction segment includes a well extending along the second extraction segment.

6. The extraction tool of claim 5 wherein the well is formed of a portion of a channel bored from the distal end of the extraction tip along a length of the extraction tip.

7. The extraction tool of claim 1 wherein the stepped surface is sloped at an 80° angle relative to a longitudinal surface of the first extraction segment.

8. The extraction tool of claim 1 and including a handle or portion extension and the handle or portion and handle or portion extension including threaded portions to removable connect the handle or portion and the handle or portion extension.

9. A combination comprising:

an extraction tool having an extraction tip including a proximal end and a distal end and first and second extraction segments and the first extraction segment being positioned proximate to the distal end and the second extraction segment being spaced therefrom and including a recessed portion forming a recessed profile relative to the first extraction segment and a stepped surface at an interface between the first and second extraction segments; and a pin having a head portion and a stem portion, the head portion having a larger radial dimension than the stem portion and the stem portion extending through a slot of the first extraction segment and the stepped surface being aligned to form interfacing surfaces between the head portion and the stepped surface to supply an extraction force to remove the pin from a socket.

10. The combination of claim 9 wherein the head portion is seated in a well formed in the second extraction segment.

11. The combination of claim 9 wherein the stepped surface of the interface between the first and second extraction segments is sloped at an acute angle relative to a recessed surface of the second extraction segment.

12. The combination of claim 9 including:

a chamber tray having an elongated base and perimeter walls extending about the elongated base.

13. The combination of claim 9 wherein the radial dimension of the head portion of the pin is larger than a height dimension of the stepped surface at the interface between the first and second extraction segments.

14. The combination of claim 9 wherein an elongate axis of the pin is offset from a longitudinal center axis of the extraction tip.

15. An extraction tool comprising:

means for engaging a pin and supplying an extraction force to an enlarged head portion of the pin to remove the pin from a socket; and an elongated handle or portion coupled to the means for engaging to supply the extraction force to remove the pin from the socket.

* * * * *

UNITED STATES PATENT AND TRADEMARK OFFICE

CERTIFICATE OF CORRECTION

PATENT NO. : 6,725,534 B1
DATED : April 7, 2004
INVENTOR(S) : George A. Schwartzbauer It is certified that error appears in the above-identified patent and that said Letters Patent is hereby corrected as shown below:

Title page,
Item [54], Title, delete "TRASVERSE" and insert -- TRANSVERSE --.

Column 6,
Line 15, delete "portion and handle or" and insert -- portion and the handle or --.

Signed and Sealed this

Thirteenth Day of July, 2004

JON W. DUDAS
*Acting Director of the United States Patent and Trademark Office*